Jan. 24, 1933.   G. D. BISHOP   1,895,308
FRUIT GUARD
Filed Dec. 22, 1931
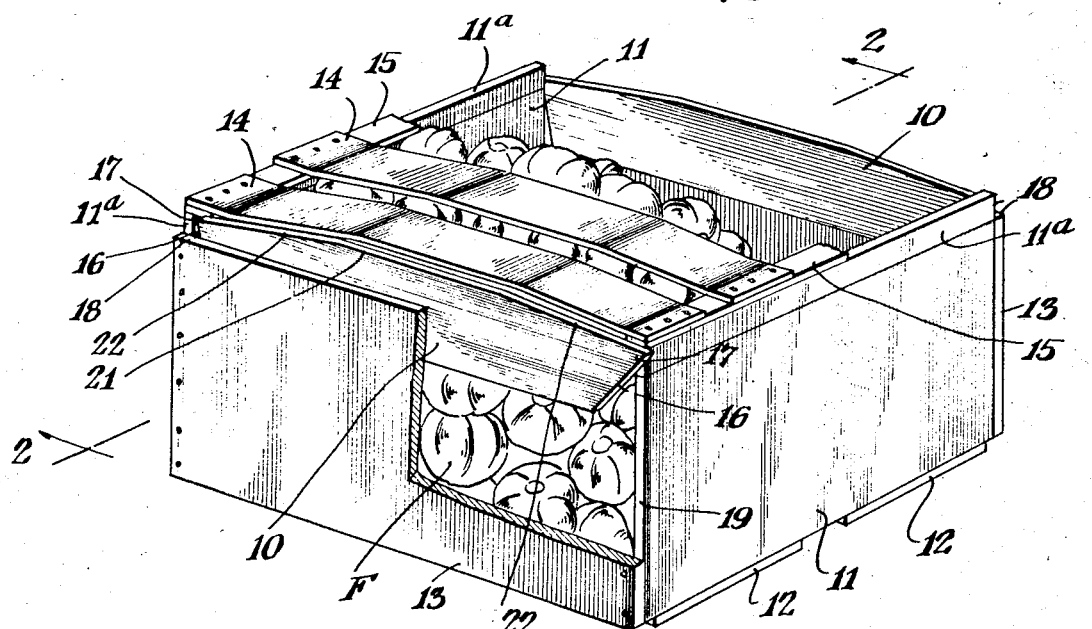
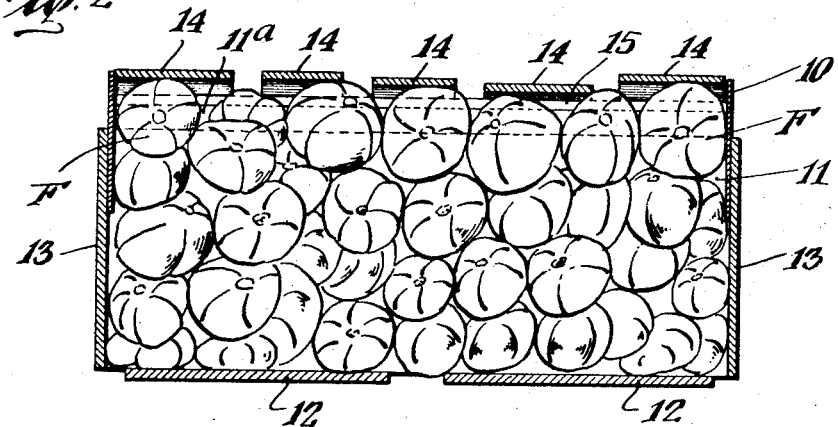
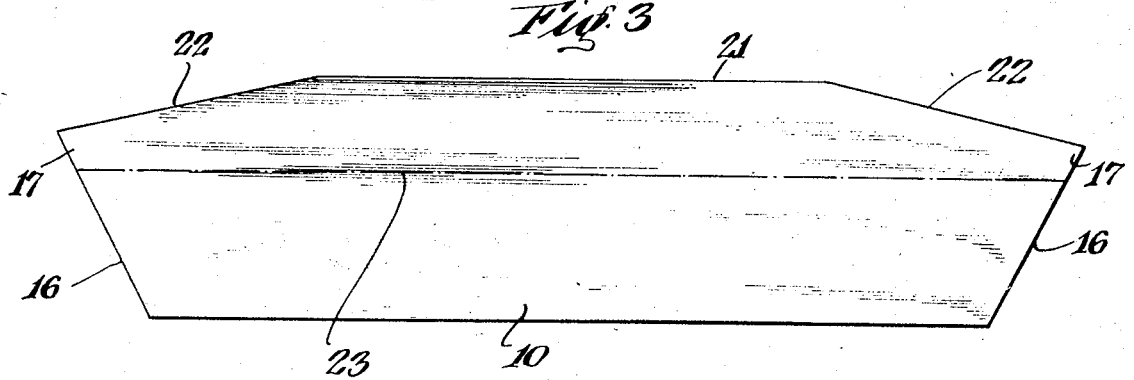
INVENTOR
George D. Bishop
BY
Austin + Dix
ATTORNEYS Patented Jan. 24, 1933

1,895,308

UNITED STATES PATENT OFFICE

GEORGE D. BISHOP, OF SANFORD, FLORIDA, ASSIGNOR TO CROWN PAPER COMPANY, OF SANFORD, FLORIDA, A CORPORATION OF DELAWARE

FRUIT GUARD

Application filed December 22, 1931. Serial No. 582,514.

This invention relates to a fruit guard adapted to be associated with a packing crate or container to protect the produce packed therein.

Produce such as fruits and vegetables are often packed for shipping purposes and in this condition are often many days in transit and storage before reaching the consumer. A slight puncture of the skin of the fruit or vegetable, or bruise caused by improper packing, will often cause a considerable portion of the produce within the container to decay and be unfit for use. In many instances the container must be constructed to permit free circulation of air therethrough and to permit inspection of the contents without opening the container. The produce in such containers is often subject to injury from two sources, namely, from the corners and general roughness presented by the container itself, and from injuries received from external agencies which may project through the openings in the aerated container.

An object of my invention is to provide a shipping medium which permits free inspection and aeration of the produce contained therein but which amply protects the produce from injury from either inside or outside agencies.

Another object of my invention is to provide a fruit guard which is adjustable to fit shipping crates and boxes of various sizes, which will adequately protect the contents from exposure and injury, even though the container walls bulge outwardly, and which is economical to manufacture, low in cost and which can be easily and quickly positioned in the shipping crate or box during the packing operation.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a perspective view of a shipping container having my novel fruit guard installed therein, certain parts of the container being broken away to illustrate certain features of the invention;

Fig. 2 is a transverse cross sectional view through the shipping container and fruit guard combination, this view being taken on line 2—2 of Fig. 1;

Fig. 3 is a face view of my novel fruit guard as it appears ready for positioning in the shipping crate or box.

I have shown in Fig. 1, for the purpose of illustration, a shipping crate which may be made of wood or fiber board material with one of my novel fruit guards 10 positioned along each side of the crate. The crate, as shown, includes end walls each comprising the end portions 11 and the cleat portions 11a and a bottom comprising the slats 12 nailed or otherwise secured to the end walls. The side walls 13 are nailed or otherwise secured to the end walls 11, as shown. The container may be filled with produce F which may be citrous or other fruits, tomatoes or vegetables. The end portions 11 are substantially the same height as the side walls 13, but the cleats 11a are nailed or otherwise secured thereto so as to project from one-half to one inch above the side walls. In this type of container a slat cover is often used which comprises the top slats 14, the ends of which are nailed or otherwise secured to the cross pieces 15. The cross pieces 15 may then be nailed to the top edge of the cleats 11a to close the crate. In unpacking the crate the slat cover is removed by loosening the cleats 11a from the end walls 11 so that the cleats come off with the cover.

My novel fruit guard 10 may be made of heavy paper board material, flexible but soft in texture and possessing considerable strength. The ends of each fruit guard is preferably mitered or tapered as at 16, and is slipped into position along the side wall of the crate before the same has been packed. The fruit guard is pushed down until the tapered end 16 strikes the upper exposed end portions 19 of the end cleats and the corner edge portions 18 of the side walls, as clearly illustrated in Fig. 1. The extreme end portions 17 of the fruit guard overlap the portions 19 of the end cleats and the fruit guard is thus held rigidly in place. It is seen, however, that the tapered portion 16 permits adjustment of the fruit guard into proper position and furthermore makes the fruit guard adjustable to properly fit boxes and crates of somewhat different lengths.

Crates and boxes are often packed so full of produce as to cause the cover slats 14 to bulge outwardly. To properly protect the produce from injury through the exposed sides of the crate, I preferably make the top portion of my fruit guard of the general shape shown in Figs. 1 and 3. The top edge of the fruit guard is provided with a crest portion 21 which extends above the extreme ends 17 of the fruit guard with the end portions 22 tapered from the crest portion 21 to the extreme end points 17. This slightly crescent shaped top edge will sufficiently conform to the bulged top slats 14 so as to adequately protect the produce along the sides of the crate. That portion of the fruit guard which extends above the longitudinal line 23 normally extends above the top edge 18 of the side walls 13 of the crate.

It is now seen that I have provided a shipping medium having guards along the exposed side walls thereof which fully protects the produce against skin punctures and injury which may be received from either the interior roughness of the container or from outside agencies which may project into the crate. The fruit guard as shown can be made by a single machine operation and can be produced very cheaply and in large quantities. The fruit guard as made is furthermore adjustable so as to fit crates and packing boxes of somewhat different size so that no difficulty is encountered during the packing operation in properly positioning the guards. The guards can be positioned in the crate before any produce has been placed therein, after the crate has been partly packed or in some instances even after the crate has been fully packed or sealed. The fruit guard is self adjustable so that little or no time is consumed in properly positioning the guard during the packing operation.

While certain novel features of the invention have been disclosed and are pointed out in the annexed claims, it will be understood that various omissions, substitutions and changes may be made by those skilled in the art without departing from the spirit of the invention.

What is claimed is:

1. A packing medium for produce including in combination, a container having side walls and end walls, the end walls being higher than the side walls, a fruit guard of a single piece of unfolded semi-rigid material positioned along each side wall of the container, each of said guards having tapered ends resting against the top edge of the side walls and on the opposite end walls adjustably supporting the guard in position, and a cover member for said container adapted to be bulged outwardly by produce packed therein, each of said guards also having a portion extending some distances above the top edge of the container to protect the produce otherwise exposed along the side of the container when said cover is in bulged condition.

2. A fruit guard adapted to be positioned in a packing container, said guard being made of a single piece of unfolded soft paperboard material against which fruit may contact without injury thereto, the ends of the guard being tapered to adjustably engage the top edge of the container to support the guard in position, and the top portion of the guard being crescent shaped to approximately conform to the bulged contour of the top wall of the container.

3. A fruit guard adapted to be positioned in a packing container, said guard being made of a single piece of unfolded soft paperboard material against which fruit may contact without injury thereto, the ends of the guard being tapered to adjustably engage the top edge of the container to support the guard in position.

4. A packing medium for produce including in combination a tomato lug box having side and end walls, the end walls being higher than the side walls, and a fruit guard of a single piece of unfolded semi-rigid material positioned along a side wall of the container, said fruit guard having end projections, the guard being entirely supported in position by wedging each end projection between the upper edge of an end wall and a side wall, said guard also having a portion extending some distance below and some distance above the top edge of the container, and a cover for said container.

In testimony whereof I have hereunto set my hand.

GEORGE D. BISHOP.